United States Patent [19]

Modic

[11] 4,401,491

[45] Aug. 30, 1983

[54] SOLID SILICONE RUBBER COMPOSITIONS AS INSULATORS FROM FIRE FOR ELECTRICAL COMPONENTS

[75] Inventor: Frank J. Modic, Scotia, N.Y.

[73] Assignee: General Electric Company, Waterford, N.Y.

[21] Appl. No.: 255,026

[22] Filed: Apr. 17, 1981

Related U.S. Application Data

[63] Continuation of Ser. No. 886,187, Mar. 13, 1978, abandoned.

[51] Int. Cl.³ .................. H01B 13/00; B05D 5/12
[52] U.S. Cl. .................................. 156/48; 156/51; 427/58; 427/117; 427/387; 428/389; 428/921
[58] Field of Search .......... 428/389, 920, 921, 447; 521/117, 123; 156/48, 51, 52; 427/105, 117, 118, 120, 230, 58, 387

[56] References Cited

U.S. PATENT DOCUMENTS

| | | | |
|---|---|---|---|
| 3,425,967 | 2/1969 | Modic | 521/123 |
| 3,923,705 | 12/1975 | Smith | 521/117 |
| 4,041,010 | 8/1977 | Jeram | 260/42.26 |

*Primary Examiner*—George F. Lesmes
*Assistant Examiner*—E. Rollins Buffalow

[57] ABSTRACT

A process for insulating electrical components located in a conduit from fire comprising mixing and pouring into the conduit a composition comrising a vinyl-containing polysiloxane polymer, an extending filler which is preferably alpha quartz, a platinum catalyst and a hydrogen-containing polysiloxane. The composition is allowed to surround the electrical components in the conduit and cured at room temperature to a solid silicone elastomer. Such a process has been found imminently suitable for insulating electrical components in a nuclear plant from fire for an extended period of time so as to maintain the electrical integrity of the components.

8 Claims, No Drawings

SOLID SILICONE RUBBER COMPOSITIONS AS INSULATORS FROM FIRE FOR ELECTRICAL COMPONENTS

This application is a continuation of patent application Ser. No. 886,187, filed Mar. 13, 1979, now abandoned.

BACKGROUND OF THE INVENTION

The present invention relates to a process for using an SiH-olefin platinum catalyzed composition for insulating components from fire and more particularly the present invention relates to a process for utilizing an SiH-olefin platinum catalyzed composition for insulating electrical components in a nuclear plant from fire so as to maintain the electrical integrity of the electrical components that are insulated.

The SiH-olefin platinum catalyzed compositions are well known, such compositions broadly comprising a vinyl-terminated polysiloxane polymer having a viscosity of anywhere from 100 to 500,000 centipoise at 25° C. The viscosity of the polymer can also be in the neighborhood of from 1,000,000 to 300,000,000 centipoise at 25° C. However, for the purposes of the present invention only vinyl-containing polymers are considered which have a viscosity below 1,000,000 centipoise at 25° C. Such vinyl-containing polydiorganosiloxane polymer which is preferably vinyl-terminated is taken and mixed with the desired amount of silica filler, usually from 10 to 200 parts of silica filler. As the cross-linking agent there is utilized a hydrogen-containing silicone resin or hydrogen-containing polysiloxane polymer. Finally, there is present in the composition anywhere from 1 to 200 parts per million of platinum in the form of a solubilized platinum complex catalyst.

A preferred form of solubilized platinum complex catalyst is platinum complexed with ether, an aldehyde or aliphatic alcohol. Another preferred type of platinum complex catalyst is platinum complexed with a vinyl-containing polysiloxane in which the chlorine content is such that the chlorine content does not exceed 1 gram atom of chlorine per gram atom of platinum. In such a composition there may be incorporated other additives such as low viscosity vinyl-containing fluids.

In any case the vinyl-containing base polymer, along with the silica filler and preferably with a platinum catalyst is packaged separately. The hydrogen polysiloxane with some of the vinyl-containing base polymer or by itself is also packaged separately. When it is desired to cure the composition, the two packages or two components are mixed, the composition is applied to the desired form and allowed to cure at room temperature to a silicone elastomer over a period of time varying anywhere from a few minutes to 24 hrs. As is known well-known inhibitors may be incorporated into such a composition such as, hydroperoxy compounds, acetylenic compounds and vinyl-containing cyclotetrasiloxanes to give the composition extended work life at room temperatures. Such compositions are also known where the base vinyl-containing polymer and optionally the hydropolysiloxanes have fluorinated substituent groups. For instance such compositions can be found in the disclosure of Jeram, U.S. Pat. No. 4,041,010, entitled "Solvent Resistant Room Temperature Vulcanizable Silicone Rubber Compositions", whose disclosure is hereby incorporated by reference. Such compositions having silicone elastomers formed therefrom have many uses, for instance, as electrical potting compounds, for forming molds for the fabrication of various plastic parts as paper release coatings, etc.

Irrespective of these many prior uses, in recent times there has risen the proliferation of nuclear power plants as utilities for the supplying of electrical energy and power to industry and private homes. In such nuclear power plants, the most predominate concern is the nuclear reactor itself, and to see that the nuclear reaction is carried out in a safe manner. However, precautions have also to be taken as far as any other extingiencies are concerned as, for instance, the possibility of fire. The possibility of fire in a nuclear plant is of even more concern than in the normal plant. In a nuclear plant even with many of the present safeguards there is possibility of an uncontrolled and unchecked fire spreading through a nuclear plant with wide-spread damage occurring. Although there are many safeguards against this possibility built into nuclear plants there is continuous effort made in further insuring the maintaining of the nuclear reactor's operation in as safe a manner as possible even with the possibility of an unchecked fire occuring in the nuclear plant. Accordingly, in connection with such concern, there has been constant effort applied in insulating electrical components and electrical cables from fire as much as is humanly possible so as to prevent fire from burning and destroying the electrical integrity of such electrical components and electrical cables, thus causing serious malfunction of the nuclear power plant and possibly even of the nuclear reactor itself. To insulate such electrical components or electrical cables from fire there have been utilized many types of procedures including the encasing of electrical components in concrete or other masonry material. However, the difficulty with such insulative techniques is that it is difficult to repair or replace the electrical component if it should break down or a design change be made.

Accordingly, it is highly desirable to have an insulative material for such electrical components in nuclear plants which will insulate the electrical component or cable as much as possible from fire, yet can be removed without great effort to repair or replace the electrical component. One effort in this direction has been the formulation of burn resistant silicone foam compositions. One example of a fire retardant silicone foam which can be used for this application is, for instance, to be found in the disclosure of Schuyler B. Smith, U.S. Pat. No. 3,923,705, which disclosure is hereby incorporated by reference. Such a foam is formed by reacting a silanol-containing diorganopolysiloxane polymer with a hydrogen-containing polysiloxane polymer in the presence of platinum catalysts such as are disclosed in the reference. It is also disclosed that additional flame retardant additives can be added to the composition such as carbon black.

A disclosure which relates to a silicone foam having burn resistant properties which is as useful as an insulative material for electrical components in nuclear plants is the disclosure of Frank J. Modic, Ser. No. 886,186 now U.S. Pat. No. 4,189,545, entitled "Silicone Foam Composition which has Burn Resistant Properties" and which was filed on the same date as the instant disclosure. This disclosure which is incorporated in the present case by reference discloses a foam formed by reacting a vinyl-containing polysiloxane with a hydrogen-containing polysiloxane in the presence of a platinum catalyst with the preferred platinum catalyst being the reaction product of a platinum halide reacted with a vinyl-containing polysiloxane in which the gram atoms of chlorine to gram atoms of platinum does not exceed one. Such a composition includes also as a necessary ingredient small amounts of water which act as the blowing agent for allowing the foam to form.

Such burn resistant silicone foams are desirable as insulative materials for electrical components in nuclear plants. However, they have two main disadvantages in that they are not as burn resistant as would be desired. Another disadvantage of such silicone foams is that they act as heat insulators and thus do not conduct the heat generated by the electric current away from the electrical copper cables very efficiently. Accordingly, the electrical components and specifically electrical cables which are insulated may at times overheat due to the good insulative properties of the foam and as such not conduct as much of the electrical current in an electrically efficient manner as would be desired. This may result in the use of oversized electrical components and electrical cables to overcome the deficiency of the silicone foams in this respect. Accordingly, while the burn resistant properties of the silicone foams are acceptable and specifically that of the Modic application is acceptable, nevertheless, it is highly desirable to find a silicone composition with even better burn resistant properties.

It should be noted that the silicone foams have one advantage that is not matched by other silicone compositions in terms of acting as burn resistant insulative materials for electrical components, that is, due to their presence as a foam they are cheaper than other silicone compositions to be used as burn resistant properties. Also, in high rise buildings having electrical components in conduits and other segregated areas as it is also essential to protect and insulate from fire such electrical components with a composition or other means so that the electrical components will maintain their integrity as long as possible; for instance, the electrical circuitry operating the elevators in high rise buildings.

It is also desirable in many ship constructions to insulate all electrical components, steam lines and other components from fire as long as possible. There has been utilized for this purpose, asbestos boards. However, the difficulty with such material even though they are good fire insulative materials is that it is difficult many times to fit the insulative material properly about the component or unit to be insulated from fire.

Accordingly, it was highly desirable to have a pourable composition which would easily fill the spaces and cavities around the electrical component and cure to form a solid which could then insulate the electrical component or other unit as long as possible from fire and maintain its integrity.

Accordingly, it is one object of the present invention to provide a process for insulating electrical components in nuclear plants, ships and high rise buildings which are located in segregated areas or conduits by the use of an SiH-olefin platinum catalyzed composition. It is an additional object of the present invention to provide a process for insulating electrical components in conduits in nuclear plants by using solid SiH-olefin platinum catalyzed compositions so as to result in an insulative electrical component with optimum burn resistant properties.

It is an additional object of the present invention to provide for a process for insulating electrical components in a conduit from fire in a nuclear plant in which the heat generated by the electric current is dissipated at a high rate such that the electrical component or electrical cable does not heat up and maintains its electrical integrity with slight, if any, loss of its efficiency.

Still an additional object of the present invention is to provide for a process in which a pourable SiH-olefin silicone rubber composition is utilized to fill the cavities around an electrical component in a conduit in a nuclear plant such that the insulated and enclosed electrical component conduits the heat away that is generated in the electric component.

These and other objects of the present invention are accomplished by means of the disclosure set forth hereinbelow.

SUMMARY OF THE INVENTION

In accordance with the above objects, there is provided by the present invention a process for insulating electrical components located in a conduit from fire and also in conducting the heat generated by the electric current away, comprising (1) mixing (A) 100 parts of vinyl-containing diorganopolysiloxane polymer having a viscosity varying from 100 to 100,000 centipoise at 25° C., a vinyl content varying from 0.0004 to 1% by weight where the organo groups are monovalent hydrocarbon radicals; (B) from 50 to 300 parts by weight of an extending filler; (C) from 0 to 100 parts by weight of a reinforcing silica filler; (D) from 1 to 200 parts per million of a platinum catalyst; and (E) from 0.5 to 30 parts by weight of a hydrogen-containing polysiloxane having from 0.4 to 1.6% by weight of hydrogen and a viscosity varying from 1 to 500 centipoise at 25° C. to form a curable mixture; (2) placing said curable mixture in said conduit so as to fill or substantially fill the space surrounding said electrical components and (3) allowing the curable compositions to cure at room temperature to form a silicone elastomer.

It should be noted that such a composition can be utilized to insulate electrical components in conduits and segregated areas of, preferably, nuclear plants, high rise buildings or in ships with the maximum burn resistance to fire. Although various types of extending fillers are preferably used in the composition, the most preferred extending filler is alpha quartz. It is preferred that reinforcing fillers not be utilized since such reinforcing fillers such as fumed silica and precipitated silica in any suitable amounts unduly increase the viscosity of the compositions such that it would be difficult to pour into a conduit. It is for this reason that the viscosity of the base polymer varies from 100 to 100,000 centipoise at 25° C. More preferably the viscosity of the base polymer varies from 100 to 50,000 centipoise at 25° C. It is underdesirable that the viscosity of the total composition exceed 500,000 centipoise at 25° C., that is, the composition with all the ingredients mixed therein.

The preferred form of platinum catalyst is platinum complexed with an aldehyde, an ether or an aliphatic alcohol or platinum complexed with a vinyl polysiloxane where the gram atoms of chlorine to gram atoms of platinum does not exceed one. Most preferably, there is utilized a platinum complex catalyst in which the vinylsiloxane is substantially free of available chlorine. Such platinum catalyst has been found to be the most efficient in such SiH-olefin reactions in producing a silicone elastomer as quickly as possible.

There is also envisioned by the present invention a conduit in a nuclear plant in which the conduit contains electrical components which are surrounded and insulated by the above silicone compositions so as to give the electrical component maximum protection from fire. It should be noted that one advantage of such silicone composition over concrete or ceramic type of insulation is that it can be removed with some difficulty admittedly; but with considerably less difficulty to repair or replace the electrical component than would be the case with concrete. Also, the compositions of the present case conducts the heat away that is generated by the electric current in the electric component thus, doing away from the need of oversized cables so as to overcome the decrease in efficiency of cables that are overheated when insulated with foam.

DESCRIPTION OF THE PREFERRED EMBODIMENT

The basic ingredient in the composition of the present invention is the vinyl-containing diorganopolysiloxane polymer having a viscosity varying from 100 to 100,000 centipoise at 25° C. Generally the vinyl-containing diorganopolysiloxane polymer may have a viscosity varying anywhere from 100 to 250,000 centipoise at 25° C. However, because of viscosity considerations, that is, it is desirable that the final uncured composition not be of such high viscosity so that it would be difficult to pump into an electrical component containing conduit, it is generally preferred that the vinyl-containing diorganopolysiloxane polymer have a viscosity in the range of 100 to 100,000 centipoise at 25° C., and more preferably have the viscosity in the range of 100 to 50,000 centipoise at 25° C. Thus, the lower the viscosity of the vinyl-containing polymer, the lower will be the viscosity of the uncured mixture that is pumped into the conduit and accordingly the easier it will be to pump. Such a vinyl-containing polymer should have a vinyl content of anywhere from 0.0004 to 1% by weight and more preferably from 0.001 to 0.005 weight percent of vinyl in the polymer. On the other hand if the vinyl content is below the lower limit then there would not be sufficient vinyl to cross-link with the hydride polysiloxane cross-linking agent and as such the composition again would not cure properly.

Accordingly, in order to obtain a properly cured silicone elastomer from the composition of the instant case, it is preferred that the vinyl-containing diorganopolysiloxane polymer have a vinyl content within the above specified ranges. The organo groups in such diorganopolysiloxane polymer are selected from monovalent hydrocarbon radicals which may, for instance, be alkyl radicals of 1 to 8 carbon atoms such as, methyl, ethyl, etc.; cycloalkyl radicals such as, cycloheptyl, cyclohexyl, etc.; mononuclear aryl radicals such as, methyl, ethyl or such as phenyl methylphenyl, ethylphenyl, etc. and halogenated monovalent hydrocarbon radicals such as, fluoroalkyl radicals. An example of a preferred fluoroalkyl radical to be utilized as a substituent group in the vinyl-containing polymer of the instant invention is 3,3,3-trifluoropropyl. Most preferred the organo groups are selected from the alkyl radicals of 1 to 8 carbon atoms; mononuclear aryl radicals such as, phenyl, and also fluoroalkyl radicals of 3 to 8 carbon atoms. Although the diorganopolysiloxane polymer may have vinyl substitution on the terminal siloxy units as well as in the siloxy units in the internal portion of the polymer chain, it is preferred that it have vinyl substitution only at the terminal siloxy atoms in the polymer chain. It should be noted that the physical properties of the cured silicone elastomer that is formed from the composition of the instant case is not an important consideration in the instant case. The important consideration in the instant case in terms of properties is flame retardancy. Nevertheless, if good physical properties are obtained in the compositions of the instant case along with good flame retardancy then that additionally makes the composition of the instant case advantageous. Accordingly, the vinyl-containing diorganopolysiloxane polymer of the instant case preferably has the formula,

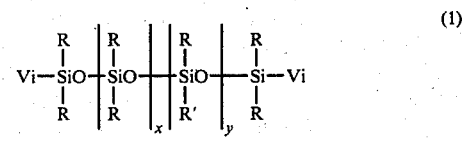

where Vi stands for vinyl and R is selected from the class consisting of aliphatically saturated monovalent hydrocarbon radicals and aromatic hydrocarbon radicals.

It is understood that by aliphatic saturated monovalent hydrocarbon radicals there would be included halogenated monovalent hydrocarbon radicals such as fluoroalkyl radicals, the preferred fluoroalkyl radical being 3,3,3-trifluoropropyl. In the foregoing formula, $R^1$ is a monovalent hydrocarbon radical and x and y vary such that the viscosity of the polysiloxane varies generally from 100 to 250,000 centipoise or more preferably varies from 100 to 100,000 centipoise at 25° C. The $R^1$ radical can include any monovalent hydrocarbon radicals given previously for R radical and can further include aliphatically unsaturated radicals such as vinyl, allyl, etc.

Accordingly, the R radical can stand for alkyl radicals of 1 to 8 carbon atoms, mononuclear aryl radicals such as, phenyl, methylphenyl, etc., and halogenated monovalent hydrocarbon radicals such as, fluoroalkyl radicals of which a preferred radical is 3,3,3-trifluoropropyl. The R' radical can include all of the above substituent groups for the R radical and further in addition can include aliphatically unsaturated radicals such as, vinyl, allyl, etc. It is preferred in line with the above discussion that the R' radical be a saturated aliphatic radical or a mononuclear aryl radical or a fluoroalkyl radical. In line with the above discussion it is not preferred that there be any vinyl units in the polymer chain. The production of such vinyl-containing diorganopolysiloxane polymers of Formula (1) is well known in silicone chemistry. Generally, diorganodichlorosilanes are hydrolyzed in water and then the foregoing hydrolyzate that is formed is taken and there is added to it catalytic amounts of potassium hydroxide at concentrations of anywhere from 50 to 1000 parts per million and the hydrolyzate is then heated at elevated temperatures to preferentially form cyclotetrasiloxanes. As is well-known in this cracking procedure there is formed both cyclotetrasiloxanes as well as cyclotrisiloxanes, cyclopentasiloxanes and other cyclic siloxanes. Utilizing such a procedure there can be obtained cyclotetrasiloxanes having various substituent groups as would be desired in the vinyl linear polymer.

Accordingly, when the cyclotetrasiloxanes are obtained there is added to them from 10 to 100 parts per million of a strong alkali metal hydroxide catalyst such as, potassium hydroxide. To this mixture there is then added the appropriate amount of chain-stoppers. In this case it would be desirable to include vinyl-terminal chain-stoppers, that is, chain-stoppers having vinyldiorganosiloxy terminal units. Such chain-stoppers are low molecular weight linear polymers containing vinyl diorganopolysiloxane units. A preferred type of chain-stopper in accordance with the instant invention is, for instance, divinyltetramethyldisiloxane. Such chain-stoppers are added to the cyclotetrasiloxanes in the appropriate amounts so as to obtain a vinyl linear polymer of the appropriate viscosity and molecular weight. Accordingly, the larger the amount of chain-stoppers that are used the lower will be the viscosity of the vinyl polymer that is formed and the lower will be the molecular weight of the polymer that is formed. The less the amount of chain-stopper that is added in proportion to the cyclotetrasiloxanes the higher will be the molecular weight of the diorganopolysiloxane polymer that is formed. When these ingredients are present together then the reaction mixture is heated at temperatures above 150° C. for anywhere from 2 to 24 hours allowing an equilibration reaction to take place. In such equilibration reaction the rings of the cyclotetrasiloxanes are broken to form a linear diorganopolysiloxane polymer of the desired molecular weight and viscosity depending on the amount of chain-stoppers that is present in the mixture. When 85% of the cyclotetrasiloxanes have been converted to linear diorganopolysiloxane polymer, then the optimum equilibration point is reached that is, as much of the cyclotetrasiloxanes are broken up to form a linear diorganopolysiloxane polymer as there is of the linear diorganopolysiloxane polymer breaking up to form cyclotetrasiloxanes. Accordingly, after this point is reached, there is added to it neutralizing agents such as, phosphoric acid or silyl phosphate to neutralize the alkali metal hydroxide catalyst and then the unreacted cyclotetrasiloxanes are stripped off. The linear diorganopolysiloxane polymer that is formed can then be utilized in the compositions of the instant processes.

A vinyl-terminated fluoroalkyl substituted diorganopolysiloxane polymer can also be formed by the procedure similar to the one discussed above, which fluorinated substituted cyclotetrasiloxanes are equilibrated in the presence of alkali metal hydroxides such as, cesium hydroxide or potassium silanolates at temperatures as low as 90° C. However, the yield that is obtained of the linear fluoro-substituted diorganopolysiloxane polymer is not as high as is obtained with non-fluorinated cyclotetrasiloxanes. Another method of obtaining the fluorinated substituted linear diorganopolysiloxane polymer is to equilibrate fluoroalkyl cyclotrisiloxanes in the presence of strong alkali metal hydroxide catalysts. The advantage with the second fluoro-substituted reaction is that the cyclotrisiloxanes will equilibrate or react at a level of about 100% to form the linear polymer versus the much smaller yield obtained with a fluorinated substituted cyclotetrasiloxane. However, the first fluoro-substituted reaction is preferred for the production of low viscosity polymers. For the further description as to the preparation of fluorinated vinyl-containing linear diorganopolysiloxane polymers that may be utilized in the invention of the instant case, one is referred to the U.S. Patent of Jeram—U.S. Pat. No. 4,041,010.

Along with the vinyl-containing polysiloxane in the invention of the instant case there must be present from 50 to 300 parts by weight of extending filler per hundred parts of the vinyl-containing diorganopolysiloxane polymer. Preferably, there is utilized from 100 to 250 parts by weight of an extending filler. Preferred extending fillers are alpha quartz, calcium carbonate, titanium dioxide, iron oxide and mixtures thereof with 100% of alpha quartz being the preferred filler, since this compound gives a composition the optimum flame resistance and also good thermal conductivity. However, the other extending fillers discussed above can be utilized with advantage in the instant case. The other reinforcing fillers that may be utilized for instance, are lithopone, zinc oxide, zirconium silicate, diatomaceous earth, magnesium oxide, chromic oxide, zirconium oxide, aluminum oxide, calcined clay, graphite, quartz, carbon black, etc. More will be said about the carbon black hereinafter. As stated previously, the preferred burn resistant filler of the instant invention is alpha quartz since that gives the composition the optimum burn resistant properties.

There can also be utilized in the instant composition from 0 to 100 parts by weight of a reinforcing silica filler per 100 parts of vinyl-containing diorganopolysiloxane polymer. Preferably, there is utilized from 0 to 30 parts by weight of the reinforcing silica filler. It should be noted that it is preferred that a non-reinforcing silica filler be utilized and that the composition contain 100%, that is, that the filler be 100% of extending filler. However, small amounts of reinforcing silica filler may be utilized to increase the physical properties of the cured silicone elastomer. Examples of reinforcing fillers are, for instance, fumed silica and precipitated silica. It is preferred that such fillers be not used in the instant invention since they unduly increase the viscosity of the uncured mixture so that it is difficult to handle. Of course, the reinforcing silica fillers may be treated with such ingredients such as, cyclotetrasiloxanes, or as disclosed in U.S. Pat. No. 2,938,009, Lucas, or with silazanes disclosed in Smith, U.S. Pat. No. 3,635,743, such that the treated reinforcing fillers will not increase the viscosity of the uncured composition by too great an increment. However, even the treated reinforcing silica fillers can result in an unduly large increase in the viscosity of the uncured composition. Accordingly, it is desired that they be utilized at low levels and most preferably not be utilized at all.

In addition to the fillers there must be present in the composition from 1 to 200 parts per million of a platinum catalyst and more specifically from 1 to 100 parts per million of a platinum catalyst. Many types of platinum compounds for this SiH-olefin addition reaction are known and such platinum catalysts may be used also for the reaction of the present case. The preferred platinum catalysts especially when optical clarity is required are those platinum compound catalysts which are soluble in the present reaction mixture. The platinum compound can be selected from those having the formula $(PtCl_2.Olefin)_2$ and $H(PtCl_3.Olefin)$ as described in U.S. Pat. No. 3,159,601, Ashby. The olefin shown in the previous two formulas can be almost any type of olefin but is preferably an alkyenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexene, cycloheptene, etc.

A further platinum containing material usable in the composition of the present invention is the platinum chloride cyclopropane complex $(PtCl_2.C_3H_6)_2$ described in U.S. Pat. No. 3,159,662, Ashby.

Still, further, the patent containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

All the patents and patent applications mentioned in this present specification are incorporated into the present application by reference.

Another platinum catalyst is that disclosed in Karstedt U.S. Pat. Nos. 3,814,730 and 3,715,334. The Karstedt preferred platinum catalysts in the composition of the instant case are ones that give the composition a very high reaction rate during curing and are the complexes formed by a vinyl siloxane with a platinum halide that is the reaction product of a platinum halide and a vinyl siloxane containing both ethanol and sodum bicarbonate in the preparation so as to reduce the chloride content to substantially zero.

The advantage of such a catalyst is that it is very effective in initiating a very rapid curing rate between the hydride crosslinking polysiloxane and the vinyl-containing polymer so as to obtain a silicone elastomer in the most efficient manner. Finally, in the composition there is present from 0.5 to 30 parts by weight of hydrogen containing polysiloxane per 100 parts of the vinyl-containing diorganopolysiloxane polymer where the hydrogen polysiloxane contains from generally 0.4 to 1.6% by weight of hydrogen and more preferably has a hydrogen content varying from 0.5 to 1.6% by weight and the viscosity generally varies from 1 to 500 centipoise at 25° C. and more preferably has the viscosity that varies from 10 to 100 centipoise at 25° C. The other substituent groups in the hydrogen polysiloxane crosslinking agent can be from any one of the monovalent hydrocarbon radicals and halogenated monovalent hydrocarbon radicals given previously for the R and R' radical of Formula 1.

Accordingly, the organo substituent groups of the hydrogen polysiloxane may be selected from alkyl radicals from 1 to 8 carbon atoms, cycloalkyl radicals of 4 to 8 carbon atoms; mononuclear aryl radicals such as phenyl, methylphenyl, ethylphenyl, etc. and fluoroalkyl radicals such as 3,3,3 trifluoropropyl. The monovalent hydrocarbon radicals that are substituted in th hydrogen polysiloxane can also be vinyl radicals if the platinum catalyst is not included with the hydrogen polysiloxane crosslinking agent when it is packaged. If the platinum catalyst is included with the hydrogen polysiloxane crosslinking agent and it contains vinyl or allyl groups then the hydrogen-polysiloxane will crosslink with itself and cure up such that it cannot be utilized as a crosslinking agent for the other component or other package of the composition containing the base vinyl containing diorganopolysiloxane polymer.

Accordingly, in addition to hydrogen, the organo substituent groups in the hydrogen polysiloxane can be any monovalent hydrocarbon radical or halogenated monovalent hydrocarbon radical. The hydrogen groups and the hydrogen polysiloxane are preferably in the polymer chain to obtain the most efficient curing mechanism. However, if a less efficient curing mechanism is tolerable the hydrogen groups can also be present in the terminal siloxy units in the hydrogen polysiloxane chain. Accordingly, the hydrogen polysiloxane preferably has the formula,

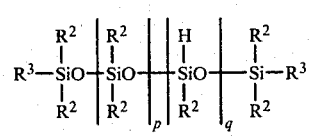
(2)

where $R^2$ is a monovalent hydrocarbon radical and $R^3$ is selected from the class consisting of hydrogen and monovalent hydrocarbon radicals and p and q may vary such that the polymer has a viscosity varying from 1 to 500 centipoise at 25° C. and more preferably has a viscosity that varies from 10 to 100 centipoise at 25° C. Accordingly, $R^2$ and $R^3$ can represent the same type of radicals or can be the same radicals with a proviso that $R^3$ radical can also be hydrogen substituent moiety. Substituent groups for the $R^2$ and $R^3$ radical can be the foregoing alkyl radicals of 1 to 8 carbon atoms, cycloalkyl radicals of up to 8 carbon atoms; mononuclear aryl radicals up to 8 carbon atoms such as phenyl, methylphenyl, etc. fluoroalkyl radicals such as 3,3,3 trifluoropropyl and with this the proviso that the $R^2$ and $R^3$ radicals can also be selected from alkenyl radicals of 2 to 8 carbon atoms if the platinum catalyst is not to be packaged with a hydrogen polysiloxane crosslinking agent. Most preferably $R^2$ and $R^3$ are selected from methyl, vinyl and phenyl radicals.

The process for obtaining the hydrogen polysiloxane crosslinking agents of Formula (2) above are well known. Such a process generally comprises the taking of the appropriate chainstoppers such as triorganochlorosilanes, hydrogen diorganochloro silanes and hydrolyzing them with diorganodichlorosilanes and hydrogenorganodichlorosilanes in water to form immediately the desired hydrogen containing polysiloxane. The resulting hydrogen-containing polysiloxane hydrolyzate is then separated from the cyclics that are formed by stripping off the cyclics and utilizing the hydrolyzate as a crosslinking agent in the processes of the instant case. Fluoroalkyl substituted hydrogen polysiloxanes are also prepared in the same manner. The hydrogen polysiloxane crosslinking agent may then be utilized as would be desired to act as a crosslinking agent in the process of the instant invention. There may then be used as a crosslinking agent a hydride resin compound of $HR^2{}_2SiO_{0.5}$ units and $SiO_7$ units where $R^2$ is as previously defined and the ratio of $H+R^2$ radicals to Si varies from 2.7 to 1 to 1.0 to 1.0. A further crosslinking agent that may be used in the instant composition is one compound of $HR^2{}_2SiO_{0.5}$ units, $SiO_2$ units, and $R^2R^5SiO$ units where the $R^2$ is as previously defined, $R^5$ is selected from the class consisting of hydrogen and monovalent hydrocarbon radicals and the ratio of $H+R^2+R^5$ to Si varies from 2.7 to 1 to 1.0 to SiO. Such resins are produced by the well known procedures of the hydrolyzing of the appropriate chlorosilanes in water with and without an organic solvent depending on how the process is carried out.

Another ingredient which may be present in the compositions of the instant case is carbon black. The function of carbon black is as an additional burn resistant additive in the compositions. Accordingly, per 100 parts of the vinyl-containing diorganopolysiloxane polymer there may be utilized anywhere from 0.1 to 10 parts of sulfur free carbon black or preferably 0.5 to 2.0 parts of carbon black. It is desirable for the present invention that the carbon black have no residual sulfur.

There should be noted that even when larger amounts of carbon black are utilized, it serves no additional flame resistant purposes in the composition, merely, being present as an extending filler. However, it has been found that carbon black in the range set forth can be utilized with advantage in the compositions of the instant case to improve the flame resistance and flame retardancy properties of the compositions. If less than 0.1 parts of carbon black is utilized in the composition then it doess not have a sufficient effect on the burn resistant or flame retardancy properties of the composition. Accordingly, there can be utilized with advantage anywhere from 0.5 to 2 parts and even more of carbon black as a burn resistant additive to the compositions of the instant case. It should be noted that other burn resistant ingredients may be added to the composition of the instant case to even further improve its burn resistant properties.

It should be noted that the amount of hydrogen-containing polysiloxane may be utilized in the invention as has been set previously as 0.5 to 30 parts by weight of the hydrogen-containing polysiloxane per 100 parts of vinyl-containing diorganopolysiloxane polymer or more preferably there is utilized from 1 to 20 parts of the hydrogen-containing polysiloxane per 100 parts of vinyl-containing diorgano polysiloxane polymer.

There must be sufficient amounts of the hydrogen polysiloxane and the hydrogen polysiloxane must contain sufficient hydrogen to properly crosslink the vinyl-containing linear diorganopolysiloxane polymer. It is desired that there be not too much of the hydrogen-containing polysiloxane present in the composition since if such polysiloxane is present in excessive amounts then it will not cure into the composition and there will be uncured hydrogen polysiloxane in the final composition which detracts from the burn resistant properties of the instant composition.

It should be noted that in this respect, this is also true of the vinyl-containing polysiloxane. If there is sizable quantities of uncured vinyl-containing linear diorganopolysiloxane polymer in the final cure composition, this would also detract from the burn resistant properties of the composition.

Other vinyl-containing fluids may be added to the composition to improve its properties and particularly its physical properties. However, as noted previously the physical properties or strength properties of the instant composition are not important in the application of the present case. However, if good physical properties can be obtained along without burn resistant properties of the composition then that makes the composition further desirable.

Finally, with the compositions of the instant case there may be utilized a mild inhibitor. Generally, with the compositions of the instant case when the two packages are mixed together, the mixture has a working life of anywhere from 1 to 15 minutes at room temperature before they set up and finally cure to a silicon elastomer. However, by the utilization of a mild inhibitor the work life of the mixture can be increased anywhere from 10 minutes to 20-25 minutes. Accordingly, in the instant compositions there may be utilized anywhere from 100 to 10,000 parts per million of a vinyl-containing cyclotetrasiloxane as an inhibitor, the parts per million being based on the total composition. More preferably there is utilized anywhere from 100 to 5,000 parts per million of the vinyl-containing cyclotetrasiloxane inhibitor. The preferred type of inhibitor is tetramethyltetravinylcyclotetrasiloxane. Such an inhibitor can be utilized with effect to give the appropriate worklife to the composition such that it can be mixed and placed in the conduits where the electrical components are located prior to its setting up. It should be noted that stronger inhibitors such as acetylenic compounds are undesired in the instant invention since they may inhibit the composition for too long a period of time such that the composition may seep out or pour out of the conduit in which is placed prior to its cure.

Accordingly, a strong inhibitor is not preferred in the process of the instant case. What is preferred is a mild inhibitor in the composition to give it a sufficient worklife for the two components to be mixed together and placed in the appropriate conduit. Then the composition should cure and set up within minutes so that it doesn't seep out of the conduit and defeat the purpose for which it was placed in the conduit prior to cure. It should be noted that the compositions of the instant case will cure at room temperature in a period of time varying from 1 to 15 minutes without an inhibitor and this is an advantage. Thus, the composition will cure soon after it is mixed and placed in the conduit into a silicone elastomer, thus preventing the seeping out problem mentioned previously. The mild inhibitor disclosed above, that is the vinyl-containing cyclotetrasiloxane may be added to increase the worklife of the compositions so as to allow sufficient time for the mixing of a particular composition prior to placing it in the conduit. However, it should also be noted that the composition can also be cured at elevated temperatures in a matter of seconds by heating it at temperatures of 100° C. or above with or without the inhibitor present.

For practical purposes, in the process of the instant invention external heating will not be used and the compositions will be cured at room temperature. Practically speaking, it would be very difficult to utilize heating means to heat the composition after it has been inserted into the conduit containing electrical components so as to cure at a faster period of time than that is obtainable by room temperature. Nevertheless, the compositions of the instant case do have flow properties so that they assume the shape around the electrical conduit and fill the space therewith with silicone compositions so as to properly insulate the electrical components from fire.

In the packaging of the composition normally the vinyl-containing polymer is packaged with the filler, carbon black and the platinum catalyst. The hydrogen polysiloxane is packaged in a separate package and may also contain unsaturation as long as the platinum catalyst is not with it. A portion of the vinyl-containing polymer or other vinyl-containing polymers and filler and other ingredients can be mixed with it. When it is desired to cure the composition, the two components are simply mixed together to form a uniform mixture and placed in the cavity that is desired to fill and allow it to cure at room temperature to silicone elastomer. In the packaging of the composition, it should be noted that the hydrogenpolysiloxane must be packaged or stored in a component separate from the vinyl-containing polysiloxane and platinum catalyst. Otherwise, the composition will cure during storage. The other point is that it is preferred that the platinum catalyst be packaged with the vinyl siloxane such that a portion of the vinyl-containing siloxane can be packaged in the second component with the hydride polysiloxane without cure taking place. There cannot be in any component the platinum catalyst, the vinyl-contaning siloxane or vinyl units in the component along with the hydrogen polysiloxane in the same component, otherwise, the composition will cure. For ease of the mixing, it is desired that some of the vinyl-containing base polymer be present with the hydrogen polysiloxane a well as some of the filler. In that manner, as will be shown in the Examples below, the two packages can be mixed together at a one to one volume or weight ratio thus, facilitating mixing and application to conduits in nuclear plants, high rise buildings and ships so as to insulate electrical components located in such conduits from fire.

If none of the vinyl-containing siloxane and filler is mixed with hydrogen siloxane then as can be appreciated a much smaller weight ratio of the hydrogen polysiloxane would be mixed with the vinyl-containing component and present slightly more difficult mixing problems. In the one to one weight ratio, which results in the easy mixing procedure, the two components can be mixed from their separate packages by an airless mixer and pumped into the conduit to enclose the electrical components and cure in place.

It should be noted that the compositions of the instant case also have good ampacity, that is they conduct the heat generated by the electric current in the cables at a sufficiently fast rate such that the electrical integrity of the circuit will not be affected as far as the conduction of electical energy and will not require the use of oversized cables as was mentioned earlier in the present specification. Another way of saying the above is that the compositions and process of the instant case result in insulating electrical cables from fire such that the cables have good derated values during the conduction of electric current, that is the composition will thermally conduct away heat at a sufficient rate so as to not affect the circuit passing through the electrical components or electrical cables located in a conduit. In electrical cables insulated with foam, the foam does not dissipate the heat caused by the electric current sufficiently and consequently the cables overheat affecting the efficiency of the conduction of the electric current. As a consequence, oversized cables have to be used.

The Examples below are given for the purpose of illustrating the present invention. The examples are not given for any purpose so as to set the bounds or scope of the invention of the instant case. All parts in the Examples are by weight.

EXAMPLE I

There was prepared a composition wherein Part A there was 100 parts of a vinyl-terminated polydimethylsiloxane polymer having a viscosity of 350 centipoise at 25° C.; 90 parts of alpha quartz; 1 part of carbon black and 30 parts per million of Lamoreaux's catalyst, that is platinum complexed with an aldehyde. Then there was prepared a second component as Part B comprising 100 parts of a vinyl-terminated polydimethylpolysiloxane polymer having a viscosity of 350 centipoise at 25° C.; 90 parts of alpha quartz and 4 parts of methylhydrogendimethylpolysiloxane containing 0.9% by weight of hydrogen, 1 part of B was mixed with 1 part of A in the following fire test to form a cured silicone elastomer that cured in 2 to 4 minutes after mixing. Such a composition was tested in the following fire test. This fire test is described in ASTM E-119 entitled "Standard Methods of Fire Tests of Building Construction and Materials".

The test was as follows: a one foot thick steel reinforced concrete wall was built containing various size openings up to 4 feet in size. Into these openings there was inserted cables on metal trays of various sizes to simulate typical electrical cables and conduits in the control room of a nuclear plant. The openings around these metal trays containing the electrical cables was filled with the above room temperature vulcanizable silicone rubber composition in 6 inches in thickness. Then the concrete wall was picked up and was made the top of a furnace where the flames of the furnace were burned for 3 hours at temperatures up to 2,000° F. After 3 hours the roof of the furnace, the wall was lifted off and subjected to a hose stream of water at a pressure of 45 lbs. per square inch gauge so as to put out the fire. In this test, various organic compositions that were tried to cover the spaces and the cables failed to maintain the electrical integrity after the test. With the tests that were carried out, the composition of the instant case the composition did not flow out of the spaces and the cables that were subjected to the test maintained their electrical integrity during and after the test and there was still left 3 inches of unburned material of the present composition after the termination of the present test. As shown the composition of the process of the instant case resulted in a superior burn resistant insulation for electrical components and electrical cables in segregated sections for nuclear plants and also for high rise buildings.

I claim:

1. A process for insulating electrical components located in a conduit from fire with a silicone composition wherein the silicone composition conducts away the heat generated by the electric current in the electrical component at a sufficient rate, comprising the steps of: (1) mixing a curable silicone composition having (A) 100 parts of a vinyl-containing diorganopolysiloxane polymer having a viscosity varying from 100 to 100,000 centipoise at 25° C., a vinyl content varying from 0.0004 to 1% by weight wherein the organo groups are monovalent hydrocarbon radicals; (B) from 50 to 300 parts by weight of an extending filler; (C) from 0 to 100 parts by weight of a reinforcing silica filler; (D) from 1 to 200 parts per million of a platinum catalyst; and (E) from 0.5 to 30 parts by weight of a hydrogen containing polysiloxane having from 0.4 to 1.6% by weight of hydrogen and a viscosity varying from 1 to 500 centipoise at 25° C., thereby forming a curable mixture; (2) placing said curable mixture in said conduit so as to fill the space surrounding said electrical components; and (3) allowing the curable composition to cure at room temperature.

2. The process of claim 1 wherein said extending filler is selected from the class consisting of alpha quartz, calcium cabonate, titanium dioxide, iron oxide and mixtures thereof.

3. The process of claim 1 wherein there is present in the composition from 0.1 to 10 parts of carbon black.

4. The process of claim 1 wherein there is present in the composition from 1 to 50 parts per million of a platinum catalyst which is a complex of platinum and compound selected from the class consisting of ethers, aliphatic alcohols and aldehydes.

5. The process of claim 1 wherein there is present in the composition from 1 to 50 parts per million of a platinum catalyst complex which is platinum combined with a vinylpolysiloxane.

6. The process of claim 1 wherein the vinyl-containing diorganopolysiloxane polymer has the formula,

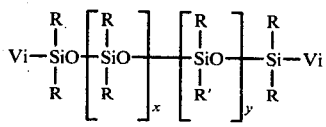

where R is selected from the class consisting of aliphatically saturated monovalent hydrocarbon radicals and aromatic hydrocarbon radicals, $R^1$ is a monovalent hydrocarbon radical and x, y vary such that the viscosity of the polymer varies from 100 to 100,000 centipoise at 25° C.

7. The process of claim 1 wherein the hydride polysiloxane has the formula,

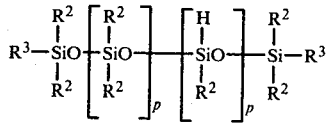

where $R^2$ is a monovalent hydrocarbon radical $R^3$ is selected from the class consisting of hydrogen and monovalent hydrocarbon radicals and p, q vary such that the polymer has a viscosity varying from 1 to 500 centipoise at 25° C.

8. The process of claim 1 further comprising the step of conducting away from the cured composition the heat generated by an electric current in the electrical component.

* * * * *